US011205006B2

(12) United States Patent
Lin

(10) Patent No.: US 11,205,006 B2
(45) Date of Patent: Dec. 21, 2021

(54) DATA STORAGE NODES COLLABORATION AND DATA PROCESSING FOR DATA STATISTICAL ANALYSIS

(71) Applicant: Advanced New Technologies Co., Ltd., George Town (KY)

(72) Inventor: Wenzhen Lin, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/175,503

(22) Filed: Oct. 30, 2018

(65) Prior Publication Data
US 2019/0130119 A1   May 2, 2019

(30) Foreign Application Priority Data
Oct. 31, 2017   (CN) .......................... 201711044510.9

(51) Int. Cl.
*G06F 21/60*   (2013.01)
*G06F 3/06*    (2006.01)
(Continued)

(52) U.S. Cl.
CPC ............ *G06F 21/602* (2013.01); *G06F 3/067* (2013.01); *G06F 3/0623* (2013.01);
(Continued)

(58) Field of Classification Search
CPC .. G06F 21/602; G06F 21/6245; G06F 3/0623; G06F 3/067; G06F 3/0659; H04L 9/0894; H04L 9/085; H04L 2209/46
See application file for complete search history.

(56) References Cited

U.S. PATENT DOCUMENTS

| 5,764,767 A * | 6/1998 | Beimel ................. H04L 9/085 380/286 |
| 2002/0076204 A1 * | 6/2002 | Nakano ................ H04L 9/0836 386/259 |

(Continued)

FOREIGN PATENT DOCUMENTS

| CN | 102694824 | 9/2012 |
| CN | 107026897 | 8/2017 |

(Continued)

OTHER PUBLICATIONS

Frikken et al., "Privacy-preserving credit checking," Proceedings of the 6th ACM conference on Electronic commerce, 2005, 147-154.
(Continued)

*Primary Examiner* — Christopher C Harris
(74) *Attorney, Agent, or Firm* — Fish & Richardson P.C.

(57) ABSTRACT

Data storage nodes that participate in a requested data statistical analysis as participant data storage nodes are determined and divided into a plurality of node sets. Data stored in each participant data storage node associated with a particular node set is encrypted, where the encrypted data is divided into a number of fragments at least equal to a number of participant data storage nodes associated with the particular node set. Each participant data storage node sends a portion of the encrypted data to each of the other participant data storage nodes within the particular node set. Each participant data storage node processes received encrypted data and data remaining on the particular participant data storage node to obtain a processing result. Each participant data storage node sends the processing result to a proxy node, wherein the proxy node performs data statistical analysis based on the processing result.

20 Claims, 8 Drawing Sheets

(51) Int. Cl.
    *G06F 21/62* (2013.01)
    *H04L 9/08* (2006.01)
(52) U.S. Cl.
    CPC ........ *G06F 3/0659* (2013.01); *G06F 21/6245* (2013.01); *H04L 9/085* (2013.01); *H04L 9/0894* (2013.01); *H04L 2209/46* (2013.01)

(56) References Cited

U.S. PATENT DOCUMENTS

| | | |
|---|---|---|
| 2003/0182565 A1 | 9/2003 | Nakano et al. |
| 2004/0117649 A1* | 6/2004 | Whyte .................. H04L 9/0891 380/286 |
| 2005/0111657 A1* | 5/2005 | Lee ....................... H04L 1/0068 380/28 |
| 2008/0137857 A1 | 6/2008 | Bellare et al. |
| 2013/0212393 A1 | 8/2013 | D'Souza |
| 2014/0150120 A1 | 5/2014 | Orsini et al. |
| 2014/0351104 A1* | 11/2014 | Abbe .................... G06Q 40/06 705/30 |
| 2016/0188253 A1 | 6/2016 | Resch et al. |
| 2016/0321654 A1 | 11/2016 | Lesavich et al. |
| 2016/0335440 A1* | 11/2016 | Clark ..................... H04L 9/085 |
| 2017/0124348 A1 | 5/2017 | Pourzandi et al. |
| 2017/0132625 A1 | 5/2017 | Kennedy |
| 2017/0163733 A1 | 6/2017 | Grefen et al. |
| 2017/0170960 A1* | 6/2017 | Shaked .................. H04L 9/008 |
| 2017/0264428 A1 | 9/2017 | Seger, II |
| 2018/0139278 A1 | 5/2018 | Bathen et al. |
| 2020/0125741 A1 | 4/2020 | Lin |

FOREIGN PATENT DOCUMENTS

| | | |
|---|---|---|
| TW | I523475 | 2/2016 |
| WO | WO 2017218590 | 12/2017 |

OTHER PUBLICATIONS

International Search Report and Written Opinion in International Application No. PCT/US2018/058423, dated Mar. 22, 2019, 16 pages.

Tan et al., "Threshold Secret Sharing Scheme Based on Multidimensional Sphere for Cloud Storage," Journal of Software, Nov. 2016, 27(11):2912-2928 (with English abstract).

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

PCT Written Opinion of the International Preliminary Examining Authority in International Application No. PCT/US2018/058423, dated Sep. 23, 2019, 7 pages.

International Preliminary Report on Patentability (Chapter II) in International Application No. PCT/US2018/058423 dated Jan. 21, 2020; 22 pages.

Zhao et al, "Secret Sharing in the Encrypted Domain", IEEE International Conference on Communications, Jun. 5, 2011, 5 pages.

\* cited by examiner

DATA STORAGE NODES COLLABORATION AND DATA PROCESSING FOR DATA STATISTICAL ANALYSIS

CROSS-REFERENCE TO RELATED APPLICATIONS

This application claims priority to Chinese Patent Application No. 201711044510.9, filed on Oct. 31, 2017, which is hereby incorporated by reference in its entirety.

TECHNICAL FIELD

The present specification relates to the field of computer technologies, and in particular, to a data statistical analysis method, apparatus, and device.

BACKGROUND

Nowadays, data statistical analysis is used for certain service scenarios based on needs. For example, in a multi-bank loan scenario, a total loan amount of a user in different banks can be obtained by using data statistical analysis. In a data statistical analysis process, a data query request usually needs to be sent to data storage nodes, and all the data storage nodes send, their stored data that corresponds to the data query request to a central node, so that the central node completes data statistical analysis based on the data sent by the data storage nodes.

Based on the existing technology, a more effective data statistical analysis method is needed.

SUMMARY

The present specification provides a data statistical analysis method, to alleviate privacy data leakage problem in a data statistical analysis process in the existing technology.

The present specification provides a data statistical analysis method, including receiving, by a data storage node, a data statistical analysis request; encrypting data corresponding to the data statistical analysis request, to obtain several pieces of encrypted data; determining a part of the several pieces of encrypted data as encrypted data that is to be distributed, and separately sending, to other data storage nodes, the encrypted data that is to be distributed; processing received encrypted data sent by the other data storage nodes and a part or all of unsent encrypted data in the several pieces of encrypted data; and sending an obtained processing result to a proxy node, so that the proxy node performs data statistical analysis based on the processing result sent by the data storage node and processing results sent by the other data storage nodes.

The present specification provides a data statistical analysis apparatus, to alleviate privacy data leakage problem in a data statistical analysis process in the existing technology.

The present specification provides a data statistical analysis apparatus, including a receiving module, configured to receive a data statistical analysis request; an encryption module, configured to encrypt data corresponding to the data statistical analysis request, to obtain several pieces of encrypted data; a first sending module, configured to determine a part of the several pieces of encrypted data as encrypted data that is to be distributed, and separately send, to other data storage nodes, the encrypted data that is to be distributed; a processing module, configured to process received encrypted data sent by the other data storage nodes and a part or all of unsent encrypted data in the several pieces of encrypted data; and a second sending module, configured to send an obtained processing result to a proxy node, so that the proxy node performs data statistical analysis based on the processing result sent by the apparatus and processing results sent by the other data storage nodes.

The present specification provides a data statistical analysis device, to alleviate privacy data leakage problem in a data statistical analysis process in the existing technology.

The present specification provides a data statistical analysis device, including one or more processors and a memory, where the memory stores a program, and the program is configured to be used by the one or more processors to perform the following steps: receiving a data statistical analysis request; encrypting data corresponding to the data statistical analysis request, to obtain several pieces of encrypted data; determining a part of the several pieces of encrypted data as encrypted data that is to be distributed, and separately sending, to other data storage nodes, the encrypted data that is to be distributed; processing received encrypted data sent by the other data storage nodes and a part or all of unsent encrypted data in the several pieces of encrypted data; and sending an obtained processing result to a proxy node, so that the proxy node performs data statistical analysis based on the processing result sent by the device and processing results sent by the other data storage nodes.

The present specification provides a data statistical analysis method, to alleviate privacy data leakage problem in a data statistical analysis process in the existing technology.

The present specification provides a data statistical analysis method, including receiving, by a proxy node, a data statistical analysis request; sending the data statistical analysis request to each data storage node, so that each data storage node returns a processing result to the proxy node according to the previous method; and performing data statistical analysis based on received processing results.

The present specification provides a data statistical analysis apparatus, to alleviate privacy data leakage problem in a data statistical analysis process in the existing technology.

The present specification provides a data statistical analysis apparatus, including a receiving module, configured to receive a data statistical analysis request; a sending module, configured to send the data statistical analysis request to each data storage node, so that each data storage node returns a processing result to the apparatus according to the previous method; and a statistics collection module, configured to perform data statistical analysis based on received processing results.

The present specification provides a data statistical analysis device, to alleviate privacy data leakage problem in a data statistical analysis process in the existing technology.

The present specification provides a data statistical analysis proxy node, including one or more processors and a memory, where the memory stores a program, and the program is configured to be used by the one or more processors to perform the following steps: receiving a data statistical analysis request; sending the data statistical analysis request to each data storage node, so that each data storage node returns a processing result to the proxy node according to the previous method; and performing data statistical analysis based on received processing results.

The at least one technical solution used in the present specification can achieve the following beneficial effects:

In one or more implementations of the present specification, when receiving a data statistical analysis request, a data storage node can encrypt data corresponding to the data statistical analysis request, to obtain several pieces of encrypted data. The data storage node can separately send a part of the several pieces of obtained encrypted data to other data storage nodes as encrypted data that is to be distributed. The data storage node can process received encrypted data sent by the other data storage nodes and a part or all of unsent encrypted data in the several pieces of obtained encrypted data, and send an obtained processing result to a proxy node, so that the proxy node can perform data statistical analysis based on processing results sent by all data storage nodes.

As each data storage node sends encrypted and processed data to the proxy node, instead of sending data corresponding to the data statistical analysis request to the proxy node, after receiving encrypted data sent by the data storage nodes, the proxy node can obtain only a total result through statistics collection, but cannot obtain the data that is stored in each data storage node and that corresponds to the data statistical analysis request. As such, data leakage problem caused by centralization is effectively alleviated, thereby improving data security in a data statistical analysis process.

BRIEF DESCRIPTION OF DRAWINGS

The accompanying drawings described here are used to provide a further understanding of the present specification, and constitute a part of the present specification. Example implementations of the present specification and descriptions of the implementations are used to explain the present specification, and constitute no improper limitation to the present specification. In the accompanying drawings.

DESCRIPTION OF IMPLEMENTATIONS

In the existing technology, when data statistical analysis is needed, a data query request can be sent to data storage nodes, and all the data storage nodes send, their stored data that corresponds to the data query request to a central node, so that the central node completes data statistical analysis based on the data sent by the data storage nodes.

Data statistical analysis can be completed in the previous method, but the central node obtains the data stored in the data storage nodes too. As the data of the data storage nodes is privacy data that needs to be protected, privacy data of the data storage nodes can be leaked in the previous method.

The present specification provides a data statistical analysis method. When receiving a data statistical analysis request, a data storage node can encrypt data corresponding to the data statistical analysis request, to obtain several pieces of encrypted data. The data storage node can separately send a part of the several pieces of obtained encrypted data to other data storage nodes as encrypted data that is to be distributed. The data storage node can process received encrypted data sent by the other data storage nodes and a part or all of unsent encrypted data in the several pieces of obtained encrypted data, and send an obtained processing result to a proxy node, so that the proxy node can perform data statistical analysis based on processing results sent by all data storage nodes.

As each data storage node sends encrypted and processed data to the proxy node, instead of sending data corresponding to the data statistical analysis request to the proxy node, after receiving encrypted data sent by the data storage nodes, the proxy node can obtain only a total result through statistics collection, but cannot obtain the data that is stored in each data storage node and that corresponds to the data statistical analysis request. As such, data leakage problem caused by centralization is effectively alleviated, thereby improving data security in a data statistical analysis process.

To make a person skilled in the art better understand the technical solutions in one or more implementations of the present specification, the following clearly and completely describes the technical solutions in the one or more implementations of the present specification with reference to the accompanying drawings in the one or more implementations of the present specification. Apparently, the described implementations are merely some but not all of the implementations of the present specification. All other implementations obtained by a person of ordinary skill in the art based on the implementations of the present specification without creative efforts shall fall within the protection scope of the present specification.

Figure 1:
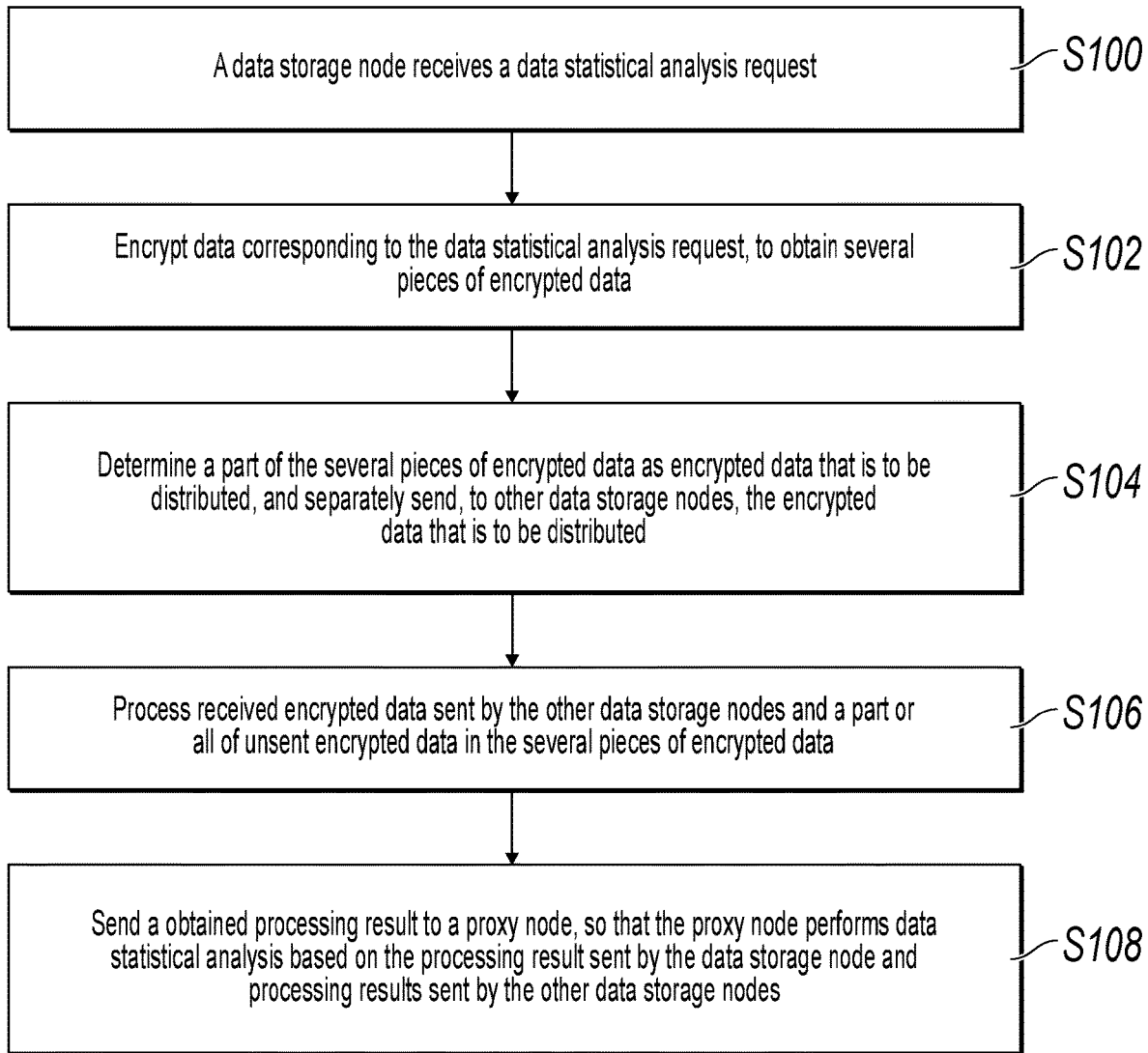
FIG. 1 is a schematic diagram illustrating a data statistical analysis process, according to the present specification.

FIG. 1 is a schematic diagram illustrating a data statistical analysis process, according to the present specification. The data statistical analysis process includes the following steps.

S100. A data storage node receives a data statistical analysis request.

In the data statistical analysis process, the data storage node can receive the data statistical analysis request, to provide corresponding data to a proxy node. For example, in a multi-bank loan scenario, a user takes out loans from multiple banks, and when a certain institution needs to query a total loan amount of the user from the banks, the institution can distribute a data statistical analysis request to the banks by using a proxy node. A device of each bank (for example, a server or a terminal of the bank) described in this scenario can be a data storage node (subsequently, for ease of description, the bank is directly referred to as a data storage node).

In the present specification, the data statistical analysis request can be generated by the proxy node based on information (for example, identification information of needed data) included in a data query request after the proxy node receives the data query request sent by a user; or a data query request sent by a user can be directly used as the data statistical analysis request; or the data statistical analysis request is a data acquisition instruction sent to each data storage node based on a data query request sent by a user, etc. Regardless of the form of the data statistical analysis request, the data statistical analysis request is mainly used to enable each data storage node to return, to the proxy node, data needed for performing data statistical analysis by the proxy node.

S102. Encrypt data corresponding to the data statistical analysis request, to obtain several pieces of encrypted data.

For each data storage node, after receiving the data statistical analysis request, the data storage node can determine data corresponding to the data statistical analysis request. Specifically, the data storage node can determine identification information included in the data statistical analysis request, and then determine data corresponding to the identification information.

For example, in a multi-bank loan scenario, after receiving a data statistical analysis request sent by a proxy node, a bank can determine a user identifier (for example, identification information such as a user name, an ID card number, or a mobile number) included in the data statistical analysis request, and then determine, based on the user identifier, a loan amount of a user corresponding to the user identifier in the bank.

Data stored in each data storage node is privacy data of the data storage node. Generally, data stored in a data storage node needs to be strictly protected, and the data cannot be directly sent to other data storage nodes, institutions, or individuals. Therefore, to ensure that the data stored in the data storage node is not leaked in a data statistical analysis process, the data storage node can encrypt the data to obtain several pieces of encrypted data, and separately send the encrypted data to other data storage nodes.

In the present specification, the data storage node can encrypt the data by using secret sharing (SS) algorithm to obtain the several pieces of encrypted data. A party can restore the data only when obtaining k (k is a threshold) or more pieces of encrypted data. For example, if the data storage node uses SS algorithm in a polynomial form, the polynomial form is as follows:

$$F(X)=(A_0+A_1X+A_2X^2+\ldots+A_{k-1}X^{k-1}) \bmod q$$

In the polynomial, represents the data, namely, data that needs to be encrypted; $A_1$ to $A_{k-1}$ are coefficients of the equation, and the coefficients can be determined based on actual demands; q represents a divisor, and the divisor can also be determined based on actual demands; and k is the previously described threshold. In the polynomial, when X has different values, different F(X) can be obtained, and the different F(X) represents different encrypted data.

Certainly, SS algorithm used by the data storage node can be in other forms. Details are omitted here for simplicity. After determining the several pieces of encrypted data, in a subsequent process, the data storage node can separately send a part of the several pieces of determined encrypted data to other data storage nodes as encrypted data that is to be distributed.

S104. Determine a part of the several pieces of encrypted data as encrypted data that is to be distributed, and separately send, to other data storage nodes, the encrypted data that is to be distributed.

Security level of the data stored in the data storage node can be ensured to some degree in the previously described data encryption method. However, if all or some of data storage nodes receiving encrypted data collude with each other, the all or some of data storage nodes can share respective received encrypted data. In this case, if data storage nodes that collude with each other obtain k or more pieces of encrypted data, the illegal data storage nodes can restore data corresponding to the encrypted data, causing data leakage.

To alleviate data leakage caused by collusion between data storage nodes, in the present specification, after determining the several pieces of encrypted data, the data storage node can use the part of the encrypted data as the encrypted data that is to be distributed, and separately send, to the other data storage nodes, the encrypted data that is to be distributed. It is likely that the other data storage nodes cannot obtain all the encrypted data even if the other data storage nodes add all obtained encrypted data together. Therefore, even if all the other data storage nodes collude with each other to share received encrypted data, the other data storage nodes cannot determine the data because the other data storage nodes cannot obtain k or more pieces of encrypted data. As such, data leakage in a data statistical analysis process is effectively alleviated, thereby improving data security.

Further, the data storage node can select, from the several pieces of determined encrypted data, fewer thank pieces of encrypted data as the encrypted data that is to be distributed, and separately send, to the other data storage nodes, the encrypted data that is to be distributed. As such, even if all the data storage nodes receiving the encrypted data that is to be distributed collude with each other, the data storage nodes cannot restore, by using a predetermined algorithm (for example, a Lagrange interpolation equation), the data (for example, $A_0$) corresponding to the encrypted data, thereby further improving data security.

It is worthwhile to note that before separately sending, to the other data storage nodes, the determined encrypted data that is to be distributed, the data storage node can determine data storage nodes that participate in the present data statistical analysis. The data storage nodes that participate in the present data statistical analysis can be data storage nodes that participate in information sending, processing, and calculation in the data statistical analysis process. In the present specification, the data storage node can determine, by using heartbeat detection method, other data storage nodes that reply with responding messages as the data storage nodes that participate in the present data statistical analysis.

Certainly, the data storage node can send, to each other data storage node, a request for querying whether the another data storage node is to receive the encrypted data that is to be distributed. If the another data storage node acknowledges that the another data storage node can participate in the present data statistical analysis, the another data storage node can send, to the data storage node based on the query request, a message for acknowledging that the another data storage node can participate in the present data statistical analysis, so that the data storage node can determine, based on the acknowledgement message, that the another data storage node can participate in the present data statistical analysis.

In addition to the previously described method, the data storage nodes that participate in the present data statistical analysis can be determined in other methods. For example, the data storage node can determine, based on historical distribution record of encrypted data, data storage nodes that receive more historical encrypted data, and then determine the data storage nodes as the data storage nodes that can participate in the present data statistical analysis.

For another example, the data storage node can determine a contribution value of each data storage node, and then determine, based on contribution values of the data storage nodes, the data storage nodes that can participate in the present data statistical analysis. The contribution value represents a degree to which a data storage node provides needed data to the proxy node in a historical process. For example, in a multi-bank loan scenario, a user needs to determine a total loan amount of the user in banks, and therefore the user can send a data statistical analysis request to the banks by using a proxy node. For each bank receiving the data statistical analysis request, if the bank determines to provide, in a certain form, a loan amount that is of the user in the bank and that is stored in the bank for the proxy node for data statistical analysis, it can be considered that the bank contributes data that is stored in the bank and that is needed for data statistical analysis to the proxy node. In this case, a contribution value of the bank can be increased by 1.

In other words, for each bank, the more times that the bank provides, in a certain form, data needed for data statistical analysis for the proxy node in response to the data statistical analysis request sent by the proxy node, the larger the bank's contribution value is.

The data storage node can sort the data storage nodes based on the contribution values of the data storage nodes, and determine data storage nodes with higher contribution values as the data storage nodes that participate in the present data statistical analysis. Certainly, the data storage nodes that participate in the present data statistical analysis can be determined in many other methods. Details are omitted here for simplicity.

In the present specification, the data storage node can first determine the other data storage nodes that participate in the present data statistical analysis, and then encrypt the data corresponding to the data statistical analysis request. A volume of obtained encrypted data can be greater than or equal to a number N+1, where N is the number of data storage nodes that participate in the present data statistical analysis.

For example, if the data storage node determines that 11 data storage nodes participate in the present data statistical analysis, the data storage node can determine the threshold k as 14 based on the number of the determined data storage nodes that participate in the present data statistical analysis, and determine an encrypted-data acquisition polynomial based on the threshold k. The data storage node can sequentially determine $F(1)$ to $F(11)$ based on the determined equation, and $F(1)$ to $F(11)$ are 11 pieces of encrypted data that is to be distributed that are sequentially sent to data storage nodes 1 to 11. Because the threshold k is 14, the data storage node can continue to determine $F(12)$ to $F(14)$ based on the equation (certainly, the data storage node can determine more than 14 pieces of encrypted data), and locally stores the three pieces of encrypted data.

Because both the volume of encrypted data and the threshold k that are determined by the data storage node are greater than the number of the other data storage nodes that participate in the present data statistical analysis, even if all the other data storage nodes collude with each other to share the encrypted data that is to be distributed and that is sent by the data storage node, none of the other data storage nodes can restore the data (namely, $A_0$) based on the obtained encrypted data. In other words, in the data statistical analysis process, in addition to obtaining, from the other data storage nodes, a part or all of encrypted data that is to be distributed, the proxy node further needs to obtain, from the data storage node, the encrypted data stored in the data storage node. As such, an obtained final statistics collection result can include the encrypted data, and an accurate statistics collection result can be obtained.

Certainly, in the present specification, the data storage node can generate N pieces of encrypted data based on a number N of the determined other data storage nodes that participate in the present data statistical analysis. However, only k−1 pieces of encrypted data are selected from the N pieces of encrypted data as the encrypted data that is to be distributed, and the encrypted data that is to be distributed is sent to k−1 data storage nodes in the N data storage nodes. Remaining encrypted data is locally stored. The threshold k here is less than N. As such, it can also ensure that even if all the other data storage nodes receiving the encrypted data that is to be distributed collude with each other, the other data storage nodes cannot restore, based on the obtained encrypted data that is to be distributed, the data stored in the data storage node.

To effectively reduce data traffic incurred when the data storage node sends, to the other data storage nodes, the encrypted data that is to be distributed, and improve information sending efficiency, in the present specification, data storage nodes can be divided into node sets. The division can be performed by one or more data storage nodes, or by a proxy node. The data storage nodes described here can be the determined data storage nodes that can participate in the present data statistical analysis, or can be all data storage nodes.

In the present specification, the action of obtaining the node sets through division can be triggered by many conditions. For example, the data storage nodes can be divided in a predetermined division method after each specified time period, to obtain the node sets, or the data storage nodes can be divided in a predetermined division method when the data statistical analysis is received, to obtain the node sets. When it is determined that the specified period is passed, but the data storage nodes are participating in a data statistical analysis process, the data storage nodes can be re-divided to obtain the node sets after the present data statistical analysis ends.

The node sets can be obtained through division in multiple methods. For example, the data storage nodes can be randomly divided to obtain the node sets, or the data storage nodes can be divided based on geographical locations of the data storage nodes. Specifically, data storage nodes whose geographical locations are relatively close to each other can be divided into one node set. Because geographical locations of data storage nodes in one node set are relatively close to each other, the data storage nodes can communicate with each other in the set at a relatively high communication rate and relatively high communication efficiency.

Certainly, the data storage nodes can be divided in many methods, and the node sets can be obtained through division in many occasions. Details are omitted here for simplicity.

Figure 2:
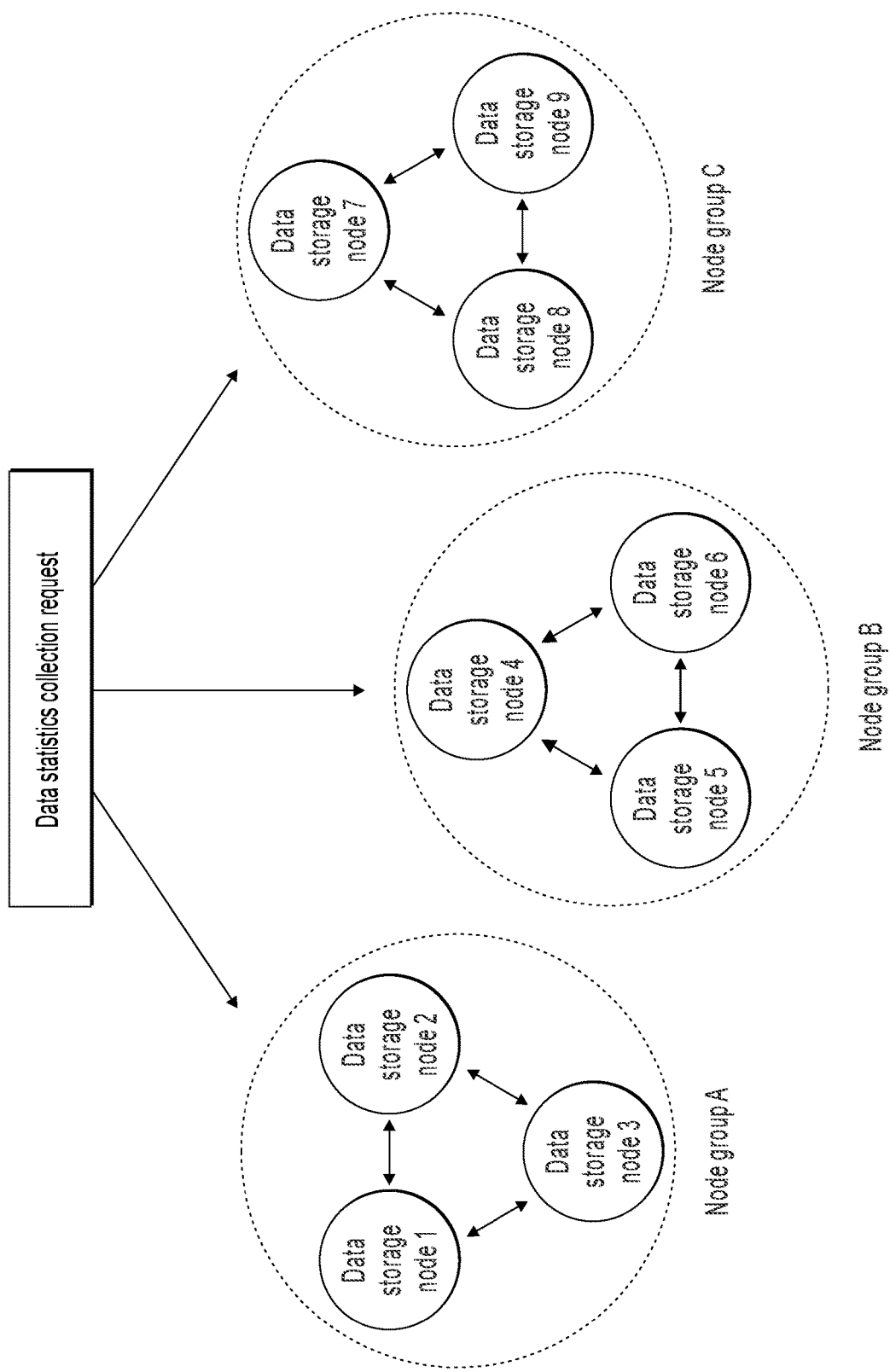
FIG. 2 is a schematic diagram illustrating node sets, according to the present specification.

In the present specification, as shown in FIG. 2, the data storage node can separately send, to other data storage nodes in a node set that the data storage node belongs to, the part of the several pieces of generated encrypted data as the encrypted data that is to be distributed.

FIG. 2 is a schematic diagram illustrating node sets, according to the present specification.

Assume that there are nine data storage nodes, and the nine data storage nodes are divided in a certain method into node set A, node set B, and node set C shown in FIG. 2. For example, in node set A, after receiving the data statistical analysis request sent by the proxy node, data storage node 1 can determine data that is stored in data storage node 1 and that corresponds to the data statistical analysis request, and encrypt the data to obtain several pieces of encrypted data. Then, data storage node 1 can respectively send two pieces of the several pieces of encrypted data to data storage node 2 and data storage node 3 in node set A as encrypted data that is to be distributed. The same can be performed by data storage node 2 and data storage node 3. In addition, the same can be performed by other node sets. Details are omitted here for simplicity.

Figure 3:
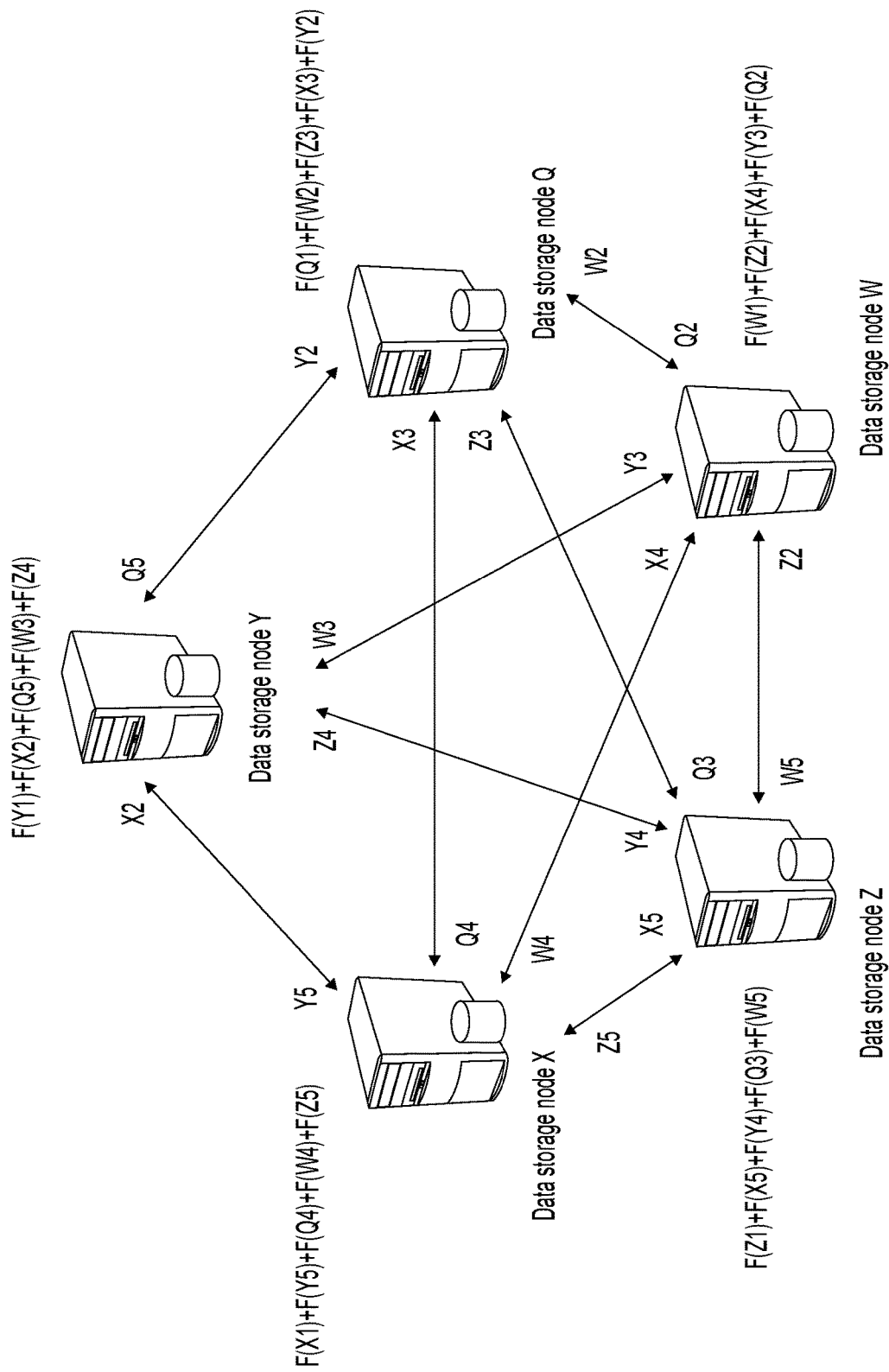
FIG. 3 is a schematic diagram illustrating that each data storage node performs statistics collection on encrypted data stored in the data storage node and encrypted data sent by other data storage nodes, according to the present specification.

Each data storage node only needs to separately send its determined encrypted data that is to be distributed to other data storage nodes in the same set that the data storage node belongs to, without performing large-scale sending. For example, the number of times of performing bidirectional communication among the five data storage nodes in the subsequent FIG. 3 is $C_5^2=10$. The bidirectional communication means that when a data storage node sends, to another data storage node, encrypted data that is to be distributed, the another data storage node can also send, to the data storage node, encrypted data that is to be distributed and that is generated by the another data storage node. For the nine data storage nodes in FIG. 2, the nine data storage nodes are divided into the three node sets, and a data storage node in each node set only needs to communication with the data storage nodes in the same node set. Therefore, a number of times of performing bidirectional communication between the nine data storage nodes in FIG. 2 is $3 \times C_3^3 = 9$.

It can be learned from the previous descriptions that the number of times of performing bidirectional communication between the divided nine data storage nodes is less than the number of times of performing bidirectional communication between the undivided five data storage nodes. Therefore, a number times of performing communication between data storage nodes can be significantly reduced through division, thereby effectively reducing network communication costs and calculation volume.

To further improve data security, a number of the node sets can be no less than 3, and a number of data storage nodes in each node set can be maintained at 3 to 5.

S106. Process received encrypted data sent by the other data storage nodes and part or all of unsent encrypted data in the several pieces of encrypted data.

For each data storage node, when sending, to other data storage nodes, encrypted data that is to be distributed, the data storage node also receives encrypted data that is sent by the other data storage nodes and that corresponds to the data statistical analysis request. In this case, the data storage node can process the received encrypted data sent by the other data storage nodes and a part or all of unsent encrypted data in several pieces of encrypted data generated by the data storage node, and obtain a corresponding processing result. Here, the encrypted data corresponding to the data statistical analysis request can be understood as encrypted data obtained after data corresponding to the data statistical analysis request is encrypted.

In the present specification, in the data statistical analysis process, the proxy node or the data storage node can separately determine, based on processing results provided by the data storage nodes, data that is stored in the data storage nodes and that corresponds to the data statistical analysis request. To alleviate it, as shown in FIG. 3, the data storage node can add the received encrypted data sent by the other data storage nodes and the part or all of the unsent encrypted data in the several pieces of generated encrypted data, to obtain a sum, and then send the sum to the proxy node in a subsequent process.

FIG. 3 is a schematic diagram illustrating that each data storage node performs statistics collection on encrypted data stored in the data storage node and encrypted data sent by other data storage nodes, according to the present specification.

There are five data storage nodes in FIG. 3. For each data storage node, the data storage node can encrypt data that is stored in the data storage node and that corresponds to the data statistical analysis request, to obtain five pieces of encrypted data, and respectively send four pieces of encrypted data to four other data storage nodes as encrypted data that is to be distributed. Certainly, the data storage node also receives encrypted data that is sent by the other four data storage nodes and that corresponds to the data statistical analysis request.

For example, data storage node X retains encrypted data F(X1) generated by data storage node X and receives encrypted data F(Y5), F(Q4), F(W4) and F(Z5) that are sent by the four other data storage nodes. Data storage node X can add the five pieces of encrypted data together to obtain a corresponding sum, and then send the sum to the proxy node. The same can be performed by the other four data storage nodes.

For each data storage node, because the data storage node sends a sum obtained through statistics collection to the proxy node, the proxy node cannot separately determine, based on each sum, data that is stored in each data storage node and that corresponds to the data statistical analysis request, but only can perform data statistical analysis based on obtained sums, to obtain a statistics collection result.

For example, because each bank sends a sum determined by the bank to a proxy node, the proxy node cannot determine a loan amount of a user in each bank based on each obtained sum, but only can obtain a total loan amount of the user in banks based on sums by using the SS algorithm. As such, it not only ensures that data stored in each bank is not leaked to other institutions or individuals, but also satisfies data statistical analysis needs.

It is worthwhile to note that in the present specification, the data storage nodes can encrypt data by using the same algorithm to obtain encrypted data. For example, when all the data storage nodes encrypt data by using the SS algorithm, polynomials in the SS algorithm used by the data storage nodes have same coefficients. As such, the data storage node can add the received encrypted data sent by the other data storage nodes and the part or all of the unsent encrypted data in the several pieces of encrypted data generated by the data storage node, to obtain the sum.

In the present specification, the SS algorithm in the polynomial form is used as an example for description. Therefore, the data storage node can directly add the received encrypted data sent by the other data storage nodes and the part or all of the unsent encrypted data in the several pieces of generated encrypted data. When another form of SS algorithm is used, the data storage node can first separately process the received encrypted data sent by the other data storage nodes and the part or all of the unsent encrypted data in the several pieces of generated encrypted data, and then add processed encrypted data together, to obtain a corresponding sum.

S108. Send an obtained processing result to a proxy node, so that the proxy node performs data statistical analysis based on the processing result sent by the data storage node and processing results sent by the other data storage nodes.

After obtaining the processing result, the data storage node can send the processing result to the proxy node, and the proxy node can perform data statistical analysis based on processing results sent by all the data storage nodes, to obtain a corresponding statistics collection result.

For example, after banks send obtained processing results to a proxy node, the proxy node can determine a total loan amount of a user in the banks by using a Lagrange interpolation equation in the SS algorithm.

It can be learned from the previous method that as each data storage node sends encrypted and processed data to the proxy node, instead of sending data corresponding to the data statistical analysis request to the proxy node, after receiving encrypted data sent by the data storage nodes, the proxy node can obtain only a total result through statistics collection, but cannot obtain the data that is stored in each data storage node and that corresponds to the data statistical analysis request. In addition, encrypted data retained by a data storage node is privacy data of the data storage node. Therefore, the data storage node has no motive for colluding with other data storage nodes to share the privacy data of the data storage node. In this case, because the other data storage nodes cannot obtain the encrypted data retained by the data storage node, even if the other data storage nodes collude with each other, the other data storage nodes cannot obtain, by sharing encrypted data that is to be distributed and that is sent by the data storage node, data that is stored in the data storage node and that corresponds to the data statistical analysis request. As such, data leakage problem caused by centralization is effectively alleviated, thereby improving data security in a data statistical analysis process.

It is worthwhile to note that in the present specification, the multi-bank loan scenario is used as an example for describing the previous data statistical analysis process, but the data statistical analysis method provided in the present specification is not merely limited to the scenario, but also applicable to other scenarios. For example, the data statistical analysis method is applicable to a scenario in which a total insurance amount of a user in multiple insurance companies is determined, or a total spending amount of a user in e-commerce platforms is determined through data statistical analysis. Other scenarios are not each listed here for simplicity.

The data statistical analysis method provided in one or more implementations of the present specification is described above. Based on the same idea, as shown in FIG. 4 and FIG. 5, the present specification further provides a corresponding data statistical analysis apparatus.

Figure 4:
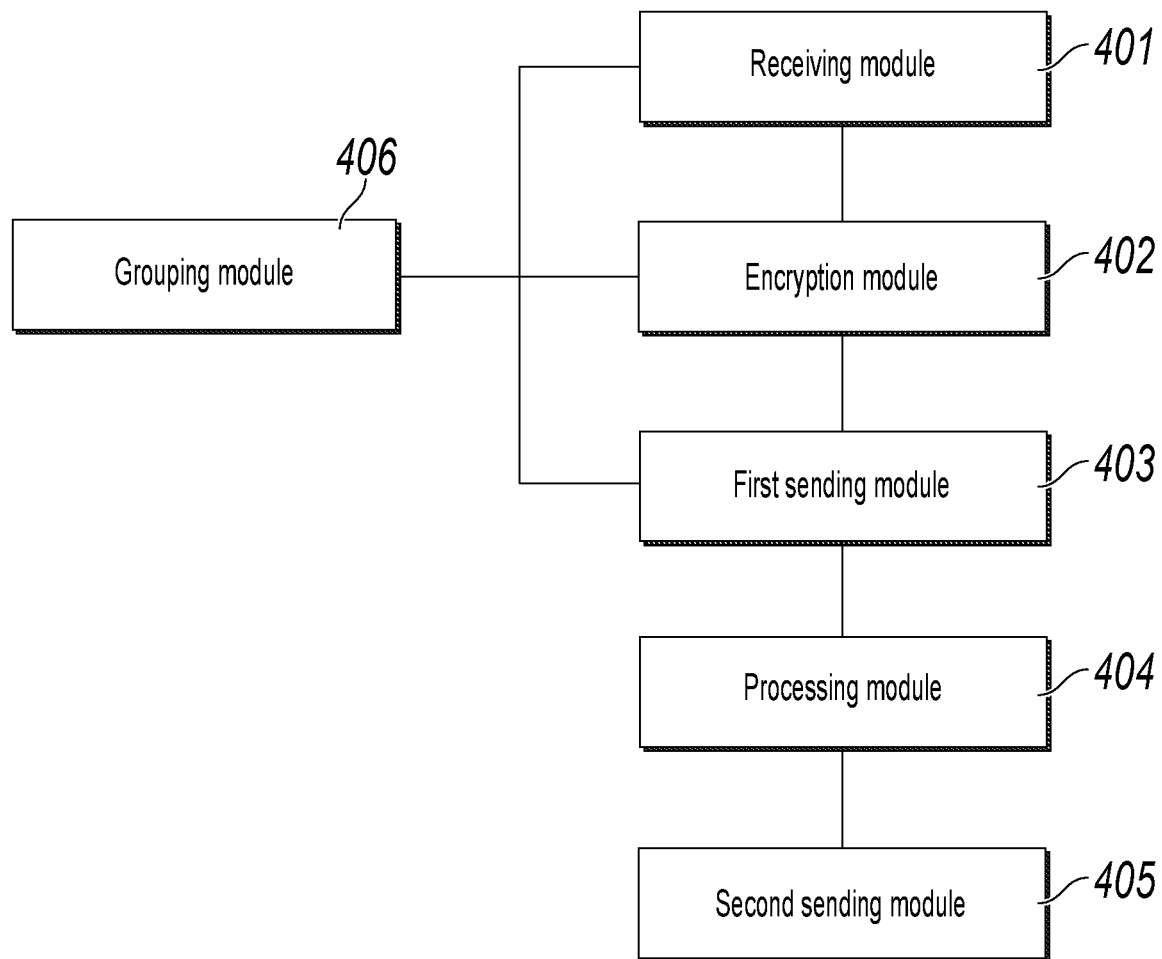
FIG. 4 is a schematic diagram illustrating a data statistical analysis apparatus, according to the present specification.
Figure 5:
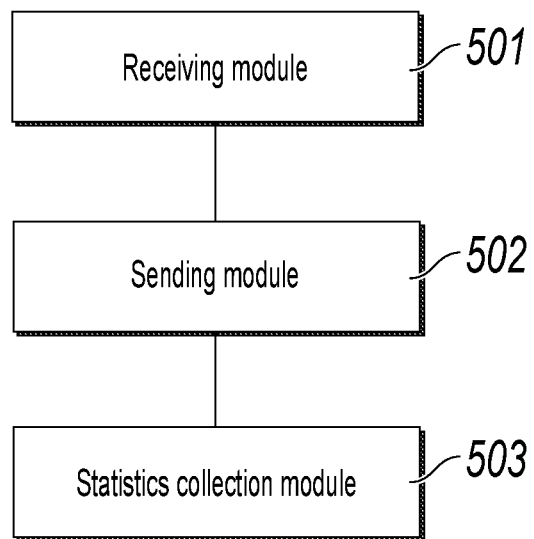
FIG. 5 is a schematic diagram illustrating another data statistical analysis apparatus, according to the present specification.

FIG. 4 is a schematic diagram illustrating a data statistical analysis apparatus, according to the present specification. The apparatus includes a receiving module 401, configured to receive a data statistical analysis request; an encryption module 402, configured to encrypt data corresponding to the data statistical analysis request, to obtain several pieces of encrypted data; a first sending module 403, configured to determine a part of the several pieces of encrypted data as encrypted data that is to be distributed, and separately send, to other data storage nodes, the encrypted data that is to be distributed; a processing module 404, configured to process received encrypted data sent by the other data storage nodes and a part or all of unsent encrypted data in the several pieces of encrypted data; and a second sending module 405, configured to send an obtained processing result to a proxy node, so that the proxy node performs data statistical analysis based on the processing result sent by the apparatus and processing results sent by the other data storage nodes.

The encryption module 402 is configured to encrypt, by using secret sharing (SS) algorithm, the data corresponding to the data statistical analysis request to obtain the several pieces of encrypted data.

The encryption module 402 is configured to encrypt, by using the SS algorithm, the data corresponding to the data statistical analysis request to obtain at least N+1 pieces of encrypted data, where N is a number of data storage nodes receiving the encrypted data that is to be distributed.

The first sending module 403 is configured to determine, from node sets obtained through division, a node set to which the apparatus belongs, and separately send, to other data storage nodes in the node set to which the apparatus belongs, the encrypted data that is to be distributed.

The apparatus further includes a division module 406, configured to divide data storage nodes in a predetermined division method after a specified period, to obtain the node sets; and/or divide data storage nodes in a predetermined division method when the data statistical analysis request is received, to obtain the node sets, where the predetermined division method includes at least one of the following: randomly dividing the data storage nodes, and dividing the data storage nodes based on geographical locations.

The number of the node sets is not less than 3, and/or the number of data storage nodes included in each node set is not less than 3 and not greater than 5.

The data statistical analysis request is a request for determining a total loan amount of a user in banks, the apparatus is a data providing device of a bank, and the data corresponding to the data statistical analysis request is a loan amount of the user in the bank.

The processing module 404 is configured to add the received encrypted data sent by other banks and the part or all of the unsent encrypted data in the several pieces of obtained encrypted data, to obtain a sum.

FIG. 5 is a schematic diagram illustrating another data statistical analysis apparatus, according to the present specification. The apparatus includes a receiving module 501, configured to receive a data statistical analysis request; a sending module 502, configured to send the data statistical analysis request to each data storage node, so that each data storage node returns a processing result to the apparatus according to the previous method; and a statistics collection module 503, configured to perform data statistical analysis based on received processing results.

Figure 6:
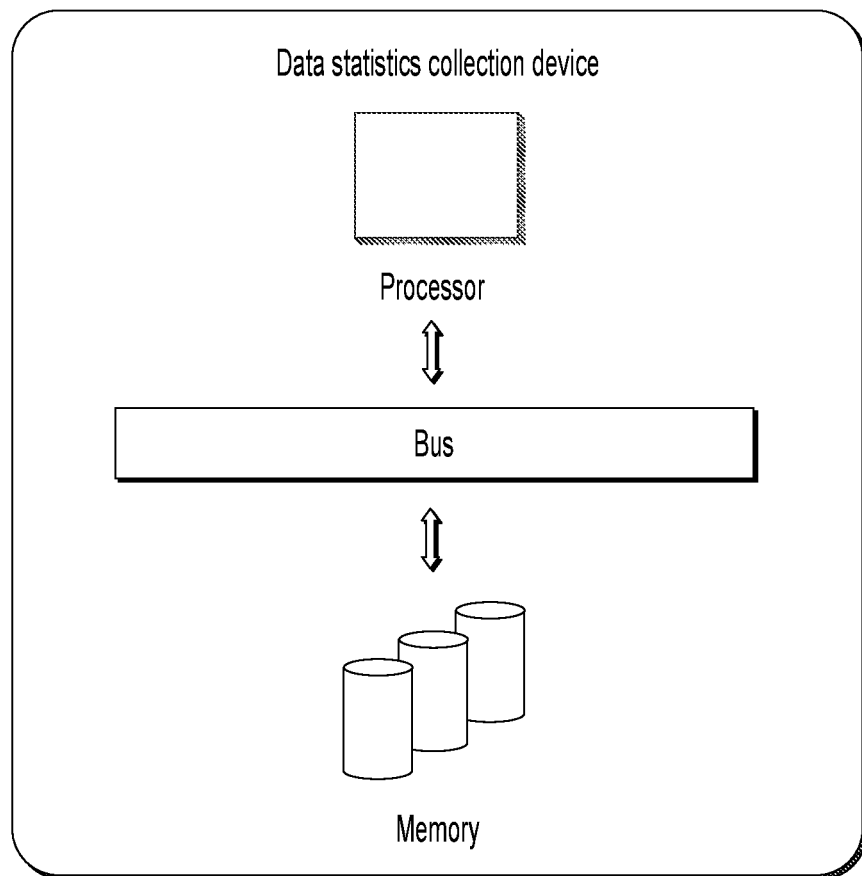
FIG. 6 is a schematic diagram illustrating a data statistical analysis device, according to the present specification.

Based on the previously described data statistical analysis method, as shown in FIG. 6, the present specification further provides a data statistical analysis device. The data statistical analysis device includes one or more processors and a memory. The memory stores a program, and the program is configured to be used by the one or more processors to perform the following steps: receiving a data statistical analysis request; encrypting data corresponding to the data statistical analysis request, to obtain several pieces of encrypted data; determining a part of the several pieces of encrypted data as encrypted data that is to be distributed, and separately sending, to other data storage nodes, the encrypted data that is to be distributed; processing received encrypted data sent by the other data storage nodes and a part or all of unsent encrypted data in the several pieces of encrypted data; and sending an obtained processing result to a proxy node, so that the proxy node performs data statistical analysis based on the processing result sent by the device and processing results sent by the other data storage nodes.

Figure 7:
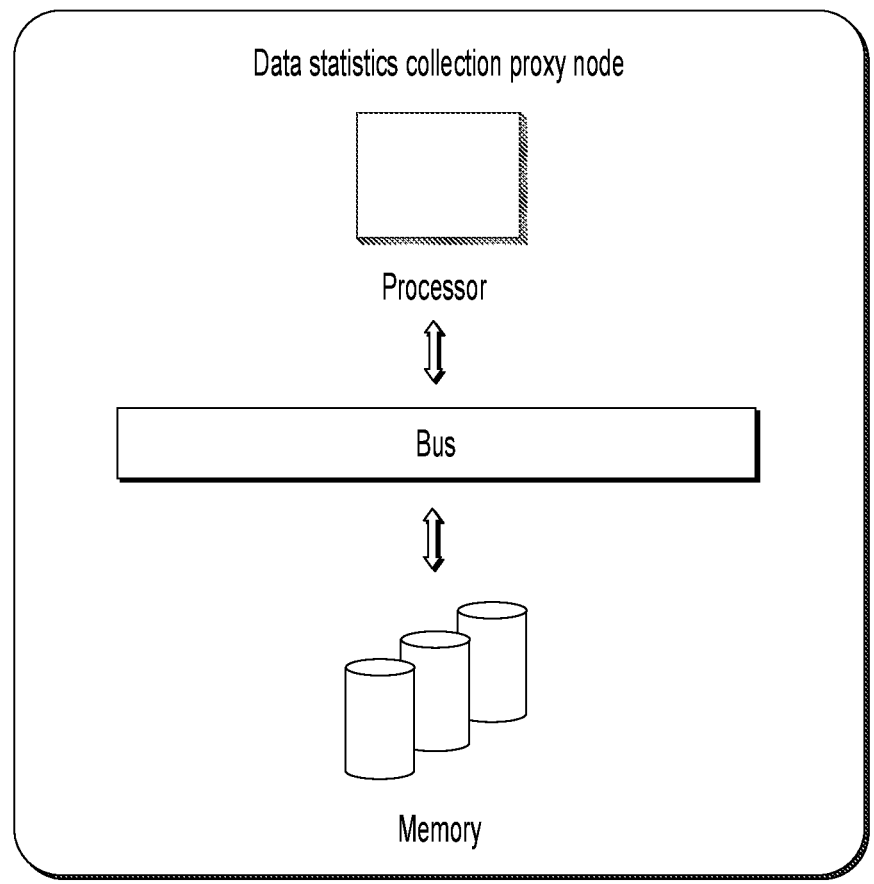
FIG. 7 is a schematic diagram illustrating a data statistical analysis proxy node, according to the present specification.

Based on the previously described data statistical analysis method, as shown in FIG. 7, the present specification further provides a data statistical analysis proxy node. The proxy node includes one or more processors and a memory. The memory stores a program, and the program is configured to be used by the one or more processors to perform the following steps: receiving a data statistical analysis request; sending the data statistical analysis request to each data storage node, so that each data storage node returns a processing result to the proxy node according to the previous method; and performing data statistical analysis based on received processing results.

In one or more implementations of the present specification, when receiving a data statistical analysis request, a data storage node can encrypt data corresponding to the data statistical analysis request, to obtain several pieces of encrypted data. The data storage node can separately send a part of the several pieces of obtained encrypted data to other data storage nodes as encrypted data that is to be distributed. The data storage node can process received encrypted data sent by the other data storage nodes and a part or all of unsent encrypted data in the several pieces of obtained encrypted data, and send an obtained processing result to a proxy node, so that the proxy node can perform data statistical analysis based on processing results sent by all data storage nodes.

As each data storage node sends encrypted and processed data to the proxy node, instead of sending data corresponding to the data statistical analysis request to the proxy node, after receiving encrypted data sent by the data storage nodes, the proxy node can obtain only a total result through statistics collection, but cannot obtain the data that is stored in each data storage node and that corresponds to the data statistical analysis request. As such, data leakage problem caused by centralization is effectively alleviated, thereby improving data security in a data statistical analysis process.

In the 1990s, a technology improvement can be clearly distinguished between a hardware improvement (for example, an improvement on a circuit structure such as a diode, a transistor, or a switch) and a software improvement (an improvement on a method process). However, with the development of technologies, an improvement on many method processes can be considered as a direct improvement on a hardware circuit structure. Almost all designers program an improved method process to a hardware circuit, to obtain a corresponding hardware circuit structure. Therefore, it cannot be considered that an improvement on a method process cannot be implemented by using a hardware entity module. For example, a programmable logic device (PLD) (for example, a field programmable gate array (FPGA)) is a type of an integrated circuit. A logical function of the programmable logic device is determined by a user through device programming. The designers perform voluntary programming to "integrate" a digital system into a single PLD without requiring a chip manufacturer to design and produce a dedicated integrated circuit chip. In addition, nowadays, instead of manually producing an integrated circuit chip, the programming is mostly implemented by "logic compiler" software, which is similar to a software compiler used during program development. Original code before compiling also needs to be written in a specific programming language, which is referred to as a hardware description language (HDL). There is more than one type of HDL, such as the ABEL (Advanced Boolean Expression Language), AHDL (Altera Hardware Description Language), Confluence, CUPL (Cornell University Programming Language), HDCal, JHDL (Java Hardware Description Language), Lava, Lola, MyHDL, PALASM, and RHDL (Ruby Hardware Description Language). Currently, the VHDL (Very-High-Speed Integrated Circuit Hardware Description Language) and Verilog are most commonly used. A person skilled in the art should also understand that a hardware circuit implementing a logical method process can be easily obtained provided that the method process is logically programmed to an integrated circuit by using the previous hardware description languages.

A controller can be implemented in any appropriate methods. For example, the controller can be a microprocessor or a processor, or a computer readable medium, a logic gate, a switch, an application-specific integrated circuit (ASIC), a programmable logic controller, or an embedded microprocessor that stores computer readable program code (such as software or firmware) that can be executed by the microprocessor or the processor. Examples of the controller include but are not limited to the following microprocessors: ARC 625D, Atmel AT91SAM, Microchip PIC18F26K20, and Silicone Labs C8051F320. The memory controller can also be implemented as a part of control logic of a memory. A person skilled in the art also knows that in addition to implementing the controller by using only computer readable program code, the steps in the method can be logically programmed to enable the controller to implement same functions in forms of a logic gate, a switch, an ASIC, a programmable logic controller, an embedded microcontroller, etc. Therefore, such a controller can be considered as a hardware component. An apparatus that is included in the controller and that is configured to implement various functions can be considered as a structure inside the hardware component. Alternatively, an apparatus configured to implement various functions can even be considered as both a software module for implementing the method and a structure inside the hardware component.

The system, apparatus, module, or unit illustrated in the previous implementations can be implemented by using a computer chip or an entity, or can be implemented by a product with a certain function. A typical implementation device is a computer. The computer can be, for example, a personal computer, a laptop computer, a cellular phone, a camera phone, a smartphone, a personal digital assistant, a media player, a navigation device, an email device, a game console, a tablet computer, a wearable device, or any combination of these devices.

For ease of description, the apparatus is described by dividing the apparatus into various units based on functions. Certainly, when the present specification is implemented, the functions of the units can be implemented in one or more pieces of software and/or hardware.

A person skilled in the art should understand that the implementations of the present specification can be provided as a method, a system, or a computer program product. Therefore, the present specification can use a form of hardware only implementations, software only implementations, or implementations with a combination of software and hardware. In addition, the present specification can use a form of a computer program product implemented on one or more computer-usable storage media (including but not limited to a magnetic disk storage, a CD-ROM, an optical memory, etc.) that include computer-usable program code.

The present specification is described with reference to the flowcharts and/or block diagrams of the method, the device (system), and the computer program product according to one or more implementations of the present specification. It should be understood that computer program instructions can be used to implement each process and/or each block in the flowcharts and/or the block diagrams and a combination of a process and/or a block in the flowcharts and/or the block diagrams. These computer program instructions can be provided to a general-purpose computer, a dedicated computer, an embedded processor, or a processor of another programmable data processing device, to generate a machine, so that the instructions executed by a computer or a processor of another programmable data processing device generate an apparatus for implementing a specified function in one or more processes in the flowcharts and/or in one or more blocks in the block diagrams.

These computer program instructions can alternatively be stored in a computer readable memory that can instruct a computer or another programmable data processing device to work in a specific method, so that the instructions stored in the computer readable memory generate an artifact that includes an instruction apparatus. The instruction apparatus implements a specified function in one or more processes in the flowcharts and/or in one or more blocks in the block diagrams.

These computer program instructions can alternatively be loaded to a computer or another programmable data processing device, so that a series of operations and steps are performed on the computer or the another programmable device, thereby generating computer-implemented processing. Therefore, the instructions executed on the computer or the another programmable device provide steps for implementing a specified function in one or more processes in the flowcharts and/or in one or more blocks in the block diagrams.

In a typical configuration, a computing device includes one or more central processing units (CPU), an input/output interface, a network interface, and a memory.

The memory can include a non-persistent memory, a random access memory (RAM), a nonvolatile memory, and/or another form in a computer readable medium, for example, a read-only memory (ROM) or a flash memory (flash memory). The memory is an example of the computer readable medium.

The computer readable medium includes persistent, non-persistent, movable, and unmovable media that can store information by using any method or technology. The information can be a computer readable instruction, a data structure, a program module, or other data. Examples of the computer storage medium include but are not limited to a phase-change random access memory (PRAM), a static random access memory (SRAM), a dynamic random access memory (DRAM), a random access memory (RAM) of another type, a read-only memory (ROM), an electrically erasable programmable read only memory (EEPROM), a flash memory or another memory technology, a compact disc read-only memory (CD-ROM), a digital versatile disc (DVD), or another optical storage, a cassette, a cassette magnetic disk storage, or another magnetic storage device or any other non-transmission medium. The computer storage medium can be configured to store information accessible to the computing device. As defined in the present specification, the computer readable medium does not include computer readable transitory media (transitory media) such as a modulated data signal and a carrier.

It is worthwhile to note that the term "include", "comprise", or their any other variants are intended to cover a non-exclusive inclusion, so that a process, a method, a commodity, or a device that includes a series of elements not only includes those elements but also includes other elements that are not expressly listed, or further includes elements inherent to such process, method, commodity, or device. An element proceeded by "includes a . . . " does not, without more constraints, preclude the existence of additional identical elements in the process, method, commodity, or device that includes the element.

The present specification can be described in the general context of a computer executable instruction executed by a computer, for example, a program module. Generally, the program module includes a routine, a program, an object, a component, a data structure, etc. for executing a particular task or implementing a particular abstract data type. The one or more implementations of the present specification can also be practiced in distributed computing environments. In the distributed computing environments, tasks are executed by remote processing devices that are connected to each other by using a communications network. In the distributed computing environments, the program module can be located in both local and remote computer storage media including storage devices.

The implementations of the present specification are all described in a progressive way. For the same or similar parts in the implementations, references can be made to each other. Each implementation focuses on a difference from other implementations. Particularly, a system implementation is basically similar to a method implementation, and therefore is briefly described. For relevant parts, references can be made to some descriptions in the method implementation.

Specific implementations of the present specification are described above. Other implementations fall within the scope of the appended claims. In some cases, the actions or steps described in the claims can be performed in an order different from the order in the implementation and the desired results can still be achieved. In addition, the process depicted in the accompanying drawings does not necessarily require a particular execution order to achieve the desired results. In some implementations, multi-tasking and parallel processing can be advantageous.

The previous descriptions are merely one or more implementations of the present specification, and are not intended to limit the present specification. For a person skilled in the art, the one or more implementations of the present specification can have various modifications and changes. Any modification, equivalent replacement, improvement, etc. made without departing from the spirit and principle of the one or more implementations of the present specification shall fall within the scope of the claims of the present specification.

Figure 8:
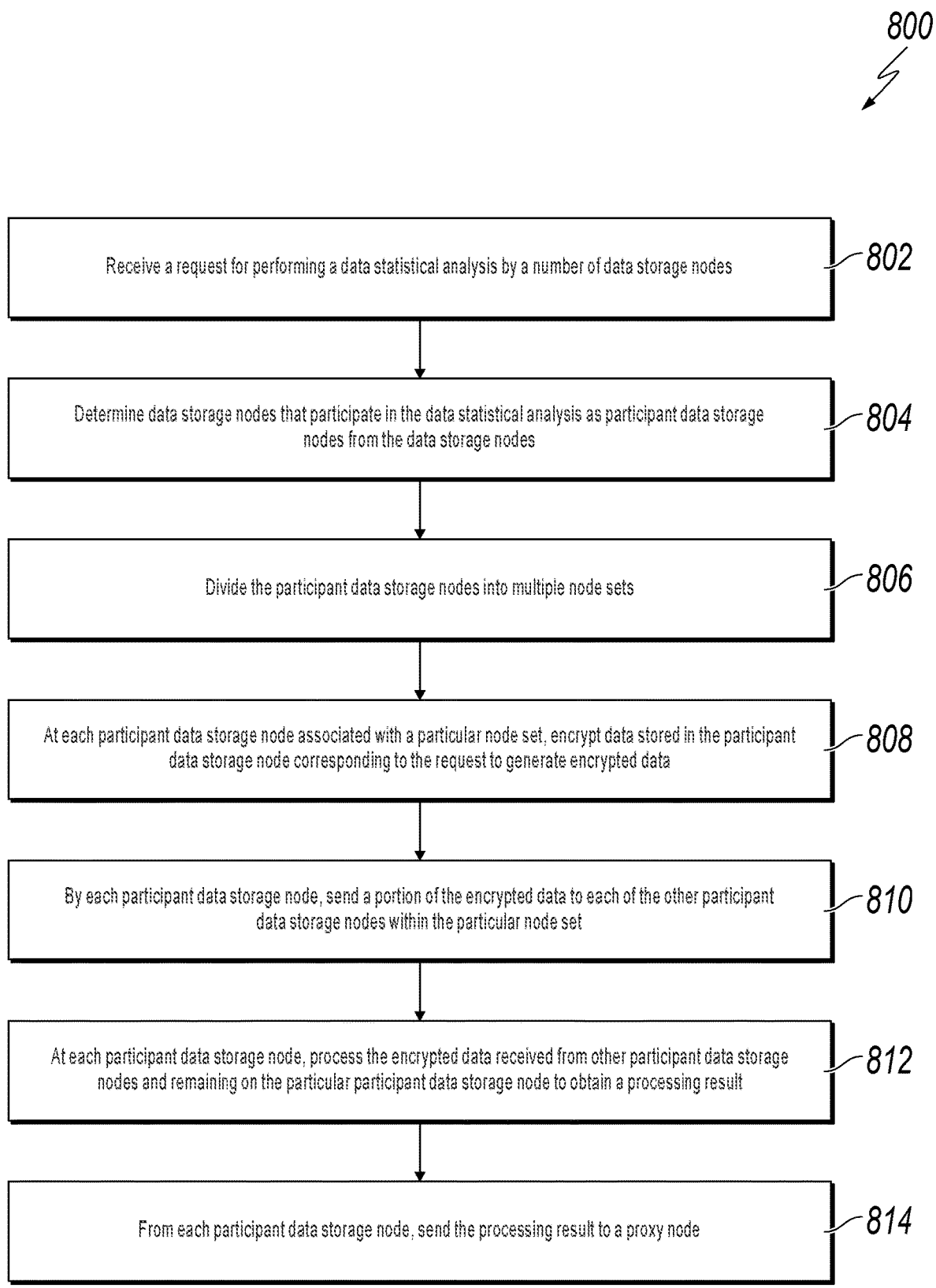
FIG. 8 is a flowchart illustrating an example of a computer-implemented method for data storage nodes collaboration and data processing according to an implementation of the present disclosure.

FIG. 8 is a flowchart illustrating an example of a computer-implemented method 800 for data storage nodes collaboration and data processing, according to an implementation of the present disclosure. For clarity of presentation, the description that follows generally describes method 800 in the context of the other figures in this description. However, it will be understood that method 800 can be performed, for example, by any system, environment, software, and hardware, or a combination of systems, environments, software, and hardware, as appropriate. In some implementations, various steps of method 800 can be run in parallel, in combination, in loops, or in any order.

At 802, a request for performing a data statistical analysis is received by a number of data storage nodes. In some implementations, prior to receiving the request for performing a data analysis, the number of data storage nodes can be divided into multiple executive regions based on a predetermined division method. In some implementation, prior to receiving the request for performing a data analysis and each time when a request for performing a data analysis is received, the number of data storage nodes can be divided into multiple executive regions based on a predetermined division method. In such implementations, the number of data storage nodes are divided into multiple executive regions randomly or based on geographical locations associated with the data storage nodes. From 802, method 800 proceeds to 804.

At 804, from the number of data storage nodes, data storage nodes that participate in the data statistical analysis are determined as participant data storage nodes. In some implementations, the data storage nodes that participate in the data statistical analysis are determined by a heartbeat detection method or based on a contribution value associated with each data storage node. From 804, method 800 proceeds to 806.

At 806, the participant data storage nodes are divided into a number of node sets. In some implementations, the number of the node sets is at least 3, and the number of participant data storage nodes comprising each node set is within a range of 3 to 5. From 806, method 800 proceeds to 808.

At 808, at each participant data storage node associated with a particular node set, data stored in the participant data storage node corresponding to the request to generate encrypted data is encrypted. In some implementations, the encrypted data is divided into a number of fragments at least equal to a number of participant data storage nodes associated with the particular node set.

In such implementations, to encrypt the data stored in the participant data storage node, for each participant data storage node, data corresponding to identification information included in the request is determined, and the data is encrypted by using a secret sharing (SS) algorithm to obtain encrypted data. From 808, method 800 proceeds to 810.

At 810, a portion of the encrypted data is sent to each of the other participant data storage nodes within the particular node set by each participant data storage node. From 810, method 800 proceeds to 812.

At 812, at each participant data storage node, the encrypted data received from other participant data storage nodes and remaining on the particular participant data storage node is processed to obtain a processing result. In some implementations, processing the encrypted data includes performing adding the encrypted data received from other data storage nodes and remaining on that particular data storage node together to generate a sum result. From 812, method 800 proceeds to 814.

At 814, from each participant data storage node, the processing result is sent to a proxy node, wherein the proxy node performs data statistical analysis based on the processing result. After 814, method 800 can stop.

Implementations of the present application can solve technical problems in data statistical analysis through data storage nodes collaboration and data processing. Traditionally, when data statistical analysis is needed, a data query request can be sent to data storage nodes, and all the data storage nodes send their stored data that corresponds to the data query request to a central node, so that the central node completes data statistical analysis based on the data sent by the data storage nodes. However, because the central node also obtains the data stored in the data storage nodes, and as the data of the data storage nodes is privacy data that needs to be protected, privacy data of the data storage nodes can be leaked. What is needed is a technique to bypass these problems in the conventional methods, and providing a more secured and unified solution.

Implementations of the present application provide method and apparatus for improving data statistical analysis. According to these implementations, when a data statistical analysis request is received, data storage nodes that will participant in the data statistical analysis will be first determined and grouped into several data sets. In some implementations, the data storage nodes can also be pre-processed and divided into executive regions. Afterwards, each participant data storage node can encrypt data corresponding to the data statistical analysis request, to obtain several pieces of encrypted data. Each data storage node can separately send a part of the encrypted data to other participant data storage nodes within its node set. The participant data storage node can process the received encrypted data sent by all the other participant data storage nodes and a part or all of unsent encrypted data stored in itself, and send an obtained processing result to a proxy node, so that the proxy node can perform data statistical analysis based on processing results sent by all data storage nodes.

The invention disclosed in the present disclosure is advantageous over existing technologies in improving data processing efficiency and secrecy. First, by determining participant data storage nodes and grouping them into different node sets, data traffic incurred when the data storage nodes subsequently sending data to each other is effectively reduced, improving information transmission efficiency. Further, because under this approach, the volume of the encrypted data generated at each participant data storage nodes is greater than the total number of participant data storage nodes in that node set, it can ensure that even if all the other participant data storage nodes receiving the encrypted data collude with each other, the other participant data storage nodes cannot restore, based on the obtained encrypted data, the data stored in the sending data storage node. This way, data leakage caused by collusion between data storage nodes can be effectively prevented. In addition, since each participant data storage node sends encrypted and processed data to the proxy node, instead of sending data corresponding to the data statistical analysis request to the proxy node, after receiving encrypted data sent by the participant data storage nodes, the proxy node can obtain only a total result through statistics collection, but cannot obtain the data that is stored in each data storage node and that corresponds to the data statistical analysis request. As such, data leakage problem caused by centralization is effectively alleviated, thereby improving data security in a data statistical analysis process.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
receiving, by a plurality of data storage nodes, a request for performing a data statistical analysis;
determining, by a plurality of data storage nodes, a plurality of contribution values corresponding to the plurality of data storage nodes, wherein the plurality of contribution values represent historical data contributions of corresponding plurality of data storage nodes to a proxy node;
determining, from the plurality of data storage nodes and based on the plurality of contribution values, data storage nodes that have higher historical data contributions to the proxy node, compared to a remainder of the plurality of data storage nodes, to participate in the data statistical analysis as participant data storage nodes;

dividing the participant data storage nodes into a plurality of node sets;

encrypting, at each participant data storage node associated with a particular node set, data stored in the participant data storage node corresponding to the request to generate encrypted data, wherein the encrypted data is divided into a number of fragments at least equal to a number of participant data storage nodes associated with the particular node set;

sending, by each participant data storage node, a portion of the encrypted data to each of other participant data storage nodes within the particular node set;

processing, at each participant data storage node, the encrypted data received from other participant data storage nodes and remaining on a particular participant data storage node to obtain a processing result; and sending, from each participant data storage node, the processing result to a proxy node, wherein the proxy node performs data statistical analysis based on the processing result.

2. The computer-implemented method of claim 1, wherein a number of the node sets is at least 3, and wherein a number of participant data storage nodes comprising each node set is within a range of 3 to 5.

3. The computer-implemented method of claim 1, wherein the data storage nodes that have made more frequent historical data contributions to the proxy node have higher historical data contributions to the proxy node and higher contribution values compared to the remainder of the plurality of data storage nodes that participate in the data statistical analysis are determined by a heartbeat detection method or based on a contribution value associated with each data storage node.

4. The computer-implemented method of claim 1, further comprising:
   prior to receiving the request for performing a data analysis, dividing the plurality of data storage nodes into multiple executive regions based on a predetermined division method at a completion of a specific time period; or
   each time when a request for performing a data analysis is received, dividing the plurality of data storage nodes into multiple executive regions based on a predetermined division method.

5. The computer-implemented method of claim 4, wherein the plurality of data storage nodes are divided into multiple executive regions randomly or based on geographical locations associated with the data storage nodes.

6. The computer-implemented method of claim 1, wherein encrypting data stored comprises:
   for each participant data storage node, determining data corresponding to identification information included in the request; and
   encrypting the data by using a secret sharing (SS) algorithm to obtain encrypted data.

7. The computer-implemented method of claim 1, wherein processing the encrypted data comprises adding the encrypted data received from other data storage nodes and remaining on that particular data storage node together to generate a sum result.

8. A non-transitory, computer-readable medium storing one or more instructions executable by a computer system to perform operations comprising:
   receiving, by a plurality of data storage nodes, a request for performing a data statistical analysis;
   determining, by a plurality of data storage nodes, a plurality of contribution values corresponding to the plurality of data storage nodes, wherein the plurality of contribution values represent historical data contributions of corresponding plurality of data storage nodes to a proxy node;
   determining, from the plurality of data storage nodes and based on the plurality of contribution values, data storage nodes that have higher historical data contributions to the proxy node, compared to a remainder of the plurality of data storage nodes, to participate in the data statistical analysis as participant data storage nodes;
   dividing the participant data storage nodes into a plurality of node sets;
   encrypting, at each participant data storage node associated with a particular node set, data stored in the participant data storage node corresponding to the request to generate encrypted data, wherein the encrypted data is divided into a number of fragments at least equal to a number of participant data storage nodes associated with the particular node set;
   sending, by each participant data storage node, a portion of the encrypted data to each of other participant data storage nodes within the particular node set;
   processing, at each participant data storage node, the encrypted data received from other participant data storage nodes and remaining on a particular participant data storage node to obtain a processing result; and
   sending, from each participant data storage node, the processing result to a proxy node, wherein the proxy node performs data statistical analysis based on the processing result.

9. The non-transitory, computer-readable medium of claim 8, wherein a number of the node sets is at least 3, and wherein a number of participant data storage nodes comprising each node set is within a range of 3 to 5.

10. The non-transitory, computer-readable medium of claim 8, wherein the data storage nodes that have made more frequent historical data contributions to the proxy node have higher historical data contributions to the proxy node and higher contribution values compared to the remainder of the plurality of data storage nodes that participate in the data statistical analysis are determined by a heartbeat detection method or based on a contribution value associated with each data storage node.

11. The non-transitory, computer-readable medium of claim 8, further comprising one or more instructions to:
   prior to receiving the request for performing a data analysis, divide the plurality of data storage nodes into multiple executive regions based on a predetermined division method at a completion of a specific time period; or
   each time when a request for performing a data analysis is received, divide the plurality of data storage nodes into multiple executive regions based on a predetermined division method.

12. The non-transitory, computer-readable medium of claim 11, wherein the plurality of data storage nodes are divided into multiple executive regions randomly or based on geographical locations associated with the data storage nodes.

13. The non-transitory, computer-readable medium of claim 8, wherein encrypting data stored comprises one or more instructions to:
   for each participant data storage node, determine data corresponding to identification information included in the request; and encrypt the data by using a secret sharing (SS) algorithm to obtain encrypted data.

14. The non-transitory, computer-readable medium of claim 8, wherein processing the encrypted data comprises one or more instructions to add the encrypted data received from other data storage nodes and remaining on that particular data storage node together to generate a sum result.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
receiving, by a plurality of data storage nodes, a request for performing a data statistical analysis;
determining, by a plurality of data storage nodes, a plurality of contribution values corresponding to the plurality of data storage nodes, wherein the plurality of contribution values represent historical data contributions of corresponding plurality of data storage nodes to a proxy node;
determining, from the plurality of data storage nodes and based on the plurality of contribution values, data storage nodes that have higher historical data contributions to the proxy node, compared to a remainder of the plurality of data storage nodes, to participate in the data statistical analysis as participant data storage nodes;
dividing the participant data storage nodes into a plurality of node sets;
encrypting, at each participant data storage node associated with a particular node set, data stored in the participant data storage node corresponding to the request to generate encrypted data, wherein the encrypted data is divided into a number of fragments at least equal to a number of participant data storage nodes associated with the particular node set;
sending, by each participant data storage node, a portion of the encrypted data to each of other participant data storage nodes within the particular node set;
processing, at each participant data storage node, the encrypted data received from other participant data storage nodes and remaining on a particular participant data storage node to obtain a processing result; and sending, from each participant data storage node, the processing result to a proxy node, wherein the proxy node performs data statistical analysis based on the processing result.

16. The computer-implemented system of claim 15, wherein a number of the node sets is at least 3, and wherein a number of participant data storage nodes comprising each node set is within a range of 3 to 5.

17. The computer-implemented system of claim 15, wherein the data storage nodes that have made more frequent historical data contributions to the proxy node have higher historical data contributions to the proxy node and higher contribution values compared to the remainder of the plurality of data storage nodes that participate in the data statistical analysis are determined by a heartbeat detection method or based on a contribution value associated with each data storage node.

18. The computer-implemented system of claim 15, further comprising one or more operations to:
prior to receiving the request for performing a data analysis, divide the plurality of data storage nodes into multiple executive regions based on a predetermined division method at a completion of a specific time period; or
each time when a request for performing a data analysis is received, divide the plurality of data storage nodes into multiple executive regions based on a predetermined division method; and
wherein the plurality of data storage nodes are divided into multiple executive regions randomly or based on geographical locations associated with the data storage nodes.

19. The computer-implemented system of claim 15, wherein encrypting data stored comprises one or more operations to:
for each participant data storage node, determine data corresponding to identification information included in the request; and
encrypt the data by using a secret sharing (SS) algorithm to obtain encrypted data.

20. The computer-implemented system of claim 15, wherein processing the encrypted data comprises one or more operations to add the encrypted data received from other data storage nodes and remaining on that particular data storage node together to generate a sum result.

* * * * *